(12) United States Patent
Feldman

(10) Patent No.: US 10,750,799 B2
(45) Date of Patent: Aug. 25, 2020

(54) SURGEON GOWN WITH SEALED SLEEVES AND METHODS OF MANUFACTURING THE SAME

(71) Applicant: Medline Industries, Inc., Mundelein, IL (US)

(72) Inventor: Jonathan Feldman, Chicago, IL (US)

(73) Assignee: MEDLINE INDUSTRIES, INC., Northfield, IL (US)

( * ) Notice: Subject to any disclaimer, the term of this patent is extended or adjusted under 35 U.S.C. 154(b) by 1624 days.

(21) Appl. No.: 13/826,267

(22) Filed: Mar. 14, 2013

(65) Prior Publication Data
US 2014/0259278 A1 Sep. 18, 2014

(51) Int. Cl.
| | | |
|---|---|---|
| *A41D 13/008* | (2006.01) | |
| *A41D 13/12* | (2006.01) | |
| *B29C 65/10* | (2006.01) | |
| *B29C 65/00* | (2006.01) | |
| *B29C 65/50* | (2006.01) | |

(Continued)

(52) U.S. Cl.
CPC ....... *A41D 13/1209* (2013.01); *A41D 27/245* (2013.01); *B29C 65/10* (2013.01); *B29C 65/5021* (2013.01); *B29C 65/5042* (2013.01); *B29C 65/5092* (2013.01); *B29C 65/62* (2013.01); *B29C 65/72* (2013.01); *B29C 66/0384* (2013.01); *B29C 66/1352* (2013.01); *B29C 66/232* (2013.01); *B29C 66/43* (2013.01); *B29C 66/71* (2013.01); *B29C 66/729* (2013.01); *B29C 66/7212* (2013.01); *B29C 66/72141* (2013.01); *B29C 66/845* (2013.01); *A41D 13/008* (2013.01); *A41D 31/26* (2019.02); *B29L 2031/48* (2013.01)

(58) Field of Classification Search
CPC ..... B29C 65/62; B29C 65/4815; A41D 27/24; A41D 27/245; A41D 13/1209; Y10T 428/1362; Y10T 428/24033; Y10T 428/249945
See application file for complete search history.

(56) References Cited

U.S. PATENT DOCUMENTS

| 3,090,047 A | * | 5/1963 | De Grazia | ............. | A41D 27/24 |
| | | | | | 112/425 |
| 3,372,404 A | | 3/1968 | Getchell | | |

(Continued)

FOREIGN PATENT DOCUMENTS

| CN | 2631247 | 8/2004 |
| CN | 101081100 | 12/2007 |

(Continued)

OTHER PUBLICATIONS

Textiles intelligence, Textiles Glossary, Section F, False Twist, Printed Aug. 3, 2017.*

(Continued)

*Primary Examiner* — Richale L Quinn
(74) *Attorney, Agent, or Firm* — Philip H. Burrus, IV

(57) ABSTRACT

A medical gown (701) includes a layer of material (100) with a seam (401) disposed across the layer of material. The material can include a weave (110) of untwisted, continuous filament polyester. The material can also include a carbon filament (109). The seam is sealed by applying a tape (200) across the seam and applying heat to cause the tape to attach to the weave.

11 Claims, 7 Drawing Sheets

(51) Int. Cl.
  *B29C 65/72* (2006.01)
  *B29C 65/62* (2006.01)
  *A41D 27/24* (2006.01)
  *A41D 31/26* (2019.01)
  *B29L 31/48* (2006.01)

(56) References Cited

U.S. PATENT DOCUMENTS

| | | | |
|---|---|---|---|
| 3,585,951 A | 6/1971 | Bartosz | |
| 4,604,152 A * | 8/1986 | Liukko | A41D 27/245 156/93 |
| 4,613,534 A * | 9/1986 | Blizzard | C08J 5/12 156/156 |
| 4,775,581 A * | 10/1988 | Siniscalchi | A41D 27/24 428/343 |
| 4,971,073 A * | 11/1990 | Schneider | A61F 5/3784 128/869 |
| 5,003,902 A * | 4/1991 | Benstock | A41D 27/24 112/402 |
| 5,162,149 A * | 11/1992 | Reaney | A41D 27/24 428/315.5 |
| 5,244,718 A * | 9/1993 | Taylor | A61B 19/08 139/420 A |
| 6,079,343 A * | 6/2000 | Wong | A41B 1/08 112/441 |
| 6,497,934 B1 * | 12/2002 | Mahn, Jr. | A41D 27/24 428/355 CN |
| 6,680,100 B1 * | 1/2004 | Kocinec | A41D 27/24 2/275 |
| 6,694,528 B1 * | 2/2004 | Chang | A41D 3/02 112/418 |
| 6,716,778 B1 * | 4/2004 | Hottner | A41D 27/245 2/275 |
| 6,887,335 B2 | 5/2005 | Biro et al. | |
| 7,013,818 B2 * | 3/2006 | Zhang | A41D 27/24 112/441 |
| 7,191,720 B2 * | 3/2007 | Thomas | A41D 27/245 112/475.09 |
| 8,172,982 B2 | 5/2012 | Ales et al. | |
| 8,334,226 B2 | 12/2012 | Nhan et al. | |
| 8,782,812 B2 * | 7/2014 | Bansal | A41D 27/24 2/69 |
| 2006/0059601 A1 | 3/2006 | Opitz | |
| 2009/0036012 A1 * | 2/2009 | Nhan | A61F 13/42 442/268 |
| 2009/0056870 A1 | 3/2009 | Glenn | |
| 2011/0070796 A1 | 3/2011 | Renzo | |
| 2011/0195625 A1 | 8/2011 | Keener | |
| 2013/0196561 A1 | 8/2013 | Shibata | |
| 2013/0318693 A1 * | 12/2013 | McBride | A41D 13/1209 2/456 |
| 2014/0223648 A1 | 8/2014 | Munter | |
| 2014/0259278 A1 | 9/2014 | Feldman | |
| 2014/0311611 A1 * | 10/2014 | Burdette, III | F16L 57/00 138/110 |
| 2015/0224738 A1 | 8/2015 | Gallagher | |

FOREIGN PATENT DOCUMENTS

| | | |
|---|---|---|
| CN | 101268162 | 9/2008 |
| DE | 19857556 | 7/1999 |
| GB | 979829 | 4/1963 |
| JP | 3-76803 | 4/1991 |
| JP | 2003-171846 | 6/2003 |

OTHER PUBLICATIONS

Kruger, Sophia "Extended European Search Report", Serial No. 14158944.0; Filed Mar. 11, 2014; dated Jun. 27, 2014.
Chinese Application No. 201410093885.4; dated May 26, 2016,.
"Notice of Acceptance/Intent to Grant"New Zealand IP No. 622537; Reference No. 35214990/GCP; dated Jul. 20, 2015,.
"Office Action", Australian Application No. 2014201415; Exam Req Date Nov. 8, 2016; dated Jul. 4, 2017.
"Notice of Acceptance"Australian Application No. 2014201415; dated Nov. 29, 2017.
Gracz, Katherine, "NonFinal Office Action", U.S. Appl. No. 15/244,353; filed Feb. 1, 2017; dated Mar. 11, 2019.
Kitamura, Ryuhei, "Office Action", Japanese Patent Application No. 2014-050260; dated Feb. 2, 2018.
Kitamura, Ryuhei, "Notice of Allowance", Japanese Patent Application No. 2014-050260; dated Jul. 18, 2018.
Lambertz, Astrid, "Intent to Grant", EP Application No. 14 158944.0-1705; dated Mar. 11, 2016.
Gracz, Katharine , "Final Office Action", U.S. Appl. No. 15/422,353; filed Feb. 1, 2017; dated Aug. 29, 2019,.
Martincevic, Vedrana , "Office Action", Canadian Application No. 2,845,138; dated Oct. 10, 2019; Reference No. 10588U CA,.
Gracz, Katharine , "Non-Final Office Action", U.S. Appl. No. 15/422,353; filed Feb. 1, 2017; dated May 4, 2020.

* cited by examiner

SURGEON GOWN WITH SEALED SLEEVES AND METHODS OF MANUFACTURING THE SAME

BACKGROUND

Technical Field

This disclosure relates generally to fabrics, and more particularly to gowns.

Background Art

Medical professionals frequently interact with patients who have communicable diseases. When treating such patients, the medical professional must take care not become infected or ill due to the microorganisms or pathogens related to the disease. This is frequently accomplished by donning a medical gown. These medical gowns are sometimes referred to as an "isolation gown."

One problem associated with prior art medical gowns involves their construction. When multiple parts of the gown are sewn together, the resulting seam can act as a pathway for pathogens and other infections substances to pass through the medical gown. Such pathways put the medical services provider at risk of becoming ill. It would be advantageous to have a gown that overcomes some of the issues associated with prior art medical gowns.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
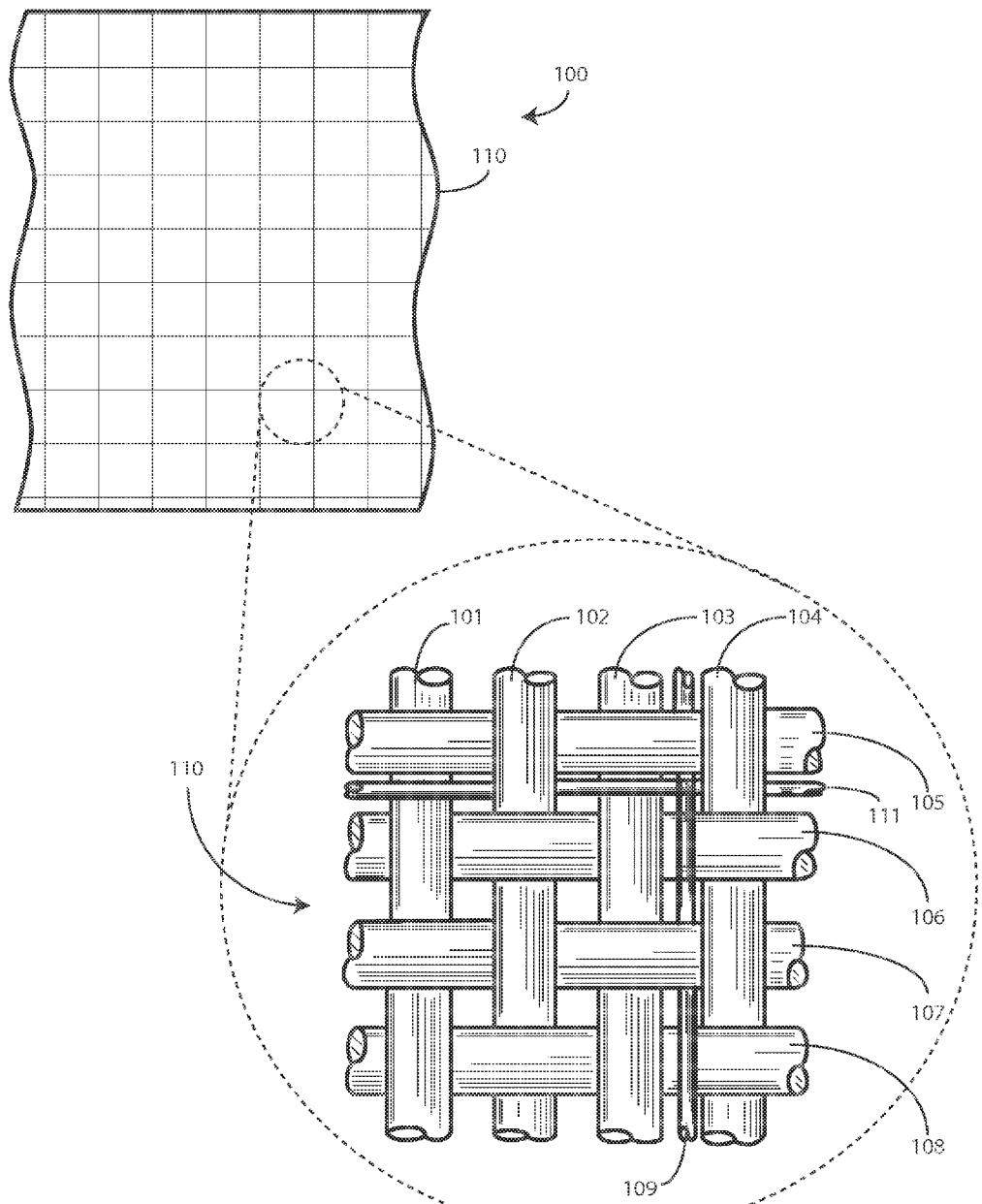
FIG. 1 illustrates one explanatory woven gown material configured in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present disclosure provide methods of constructing a gown or other garment with sealed seams. The sealing of the seams serves to protect a medical professional or other user from coming into contact with pathogens and microorganisms carrying communicable diseases. As medical professionals generally interact with patients with their hands and arms, rather than other parts of their bodies, the inclusion of sealed sleeves in a medical gown eliminates a large majority of pathways between the patient and medical professional. This is true even when the sleeves are sewn or otherwise joined to a body covering portion.

In one embodiment, the method includes constructing a seam by sewing two pieces of material together. In one embodiment, the material sewn together to form the gown or other garment is woven. In one embodiment, the material is a weave of untwisted, continuous filament polyester that also includes a carbon filament. For example, in one embodiment the material is about 99% woven polyester and about 1% carbon filament. The carbon filament provides a dual function of both rendering the material less susceptible to discharge and conduction of static electricity, but also provides a unique bonding element for tape that can be used to seal the seams.

Once the seam is constructed, in one embodiment a sealing tape can be applied across the seam. In one embodiment, the tape is a porous polytetrafluoroethylene tape. Heat can then be applied to the sealing tape to cause it to adhere to the woven material and the carbon filament disposed therein. While sealing tapes have been used in other applications, they generally require a laminated material that includes an interior membrane. Said differently, with prior art sealing techniques, the material to be sealed requires an inner layer and an outer layer of fabric that have disposed therebetween a membrane layer. The inner and outer layers are knit layers so that they can yield under thermal stimulus to allow the tape to penetrate one of the fabric layers so as to reach the membrane layer. When heat is applied to the tape, the tape "adheres" to the membrane layer. Prior art tapes will not adhere to fabric layers. Embodiments of the present invention eliminate the need for a sandwiched membrane layer by employing woven—rather than knit—materials that include a carbon filament disposed therein. Advantageously, embodiments of the disclosure provide a lower cost garment that is easier to manufacture and more comfortable for the wearer, all while providing the necessary barrier protection levels to keep the medical personnel using the gown safe from contaminants.

Turning now to FIG. 1, illustrated therein is one embodiment of a material 100 suitable for use with one or more embodiments of the disclosure. The material 100 is illustratively shown as a sheet 112. As shown in FIG. 1, the illustrative material 100 is a woven material. In one embodiment, the material 100 comprises a one-ply weave 110. In another embodiment, the material 100 comprises a two-ply weave. An expanded view of a section 112 of the sheet 112 is also shown to highlight the woven nature of the material 100.

In one embodiment, the material 100 includes warps 101,102,103,104 and wefts 105,106,107,108. The warps 101,102,103,104 are elements of the weave 110 that run vertically in the view of FIG. 1, while the wefts 105,106, 107,108 run horizontally. Note that while the terms "warps" and "wefts" are used illustratively to describe the weave 110, those of ordinary skill in the art having the benefit of this disclosure will note that alternate terms, such as "warp threads," or "warp yarns" can be substituted for "warps." Similarly, "weft fill" or "weft threads" can be substituted for "wefts."

In one embodiment, the weave 110 of the material 100 is a taffeta weave. A "taffeta" weave is a style of weave where the threads forming the wefts 105,106,107,108 and warps 101,102,103,104 intertwine alternatively to produce the checkerboard effect shown in section 112. In the illustrative embodiment of FIG. 1, the warps 101,102,103,104 and wefts 105,106,107,108 are each substantially parallel to other warps 101,102,103,104 and wefts 105,106,107,108, respectively. The warps 101,102,103,104 of this illustrated embodiment are substantially perpendicular to the wefts 105,106,107,108.

In one or more embodiments, the warps 101,102,103,104 and wefts 105,106,107,108 each comprise untwisted, continuous filament polyester. The use of untwisted, continuous filament polyester in a taffeta weave provides an exceptional barrier layer that is highly-fluid resistant. Moreover, the use of untwisted, continuous filament polyester as the warps 101,102,103,104 and wefts 105,106,107,108, when the warps 101,102,103,104 and wefts 105,106,107,108 are arranged in a taffeta weave, advantageously offers a high-density construction that resists fluid penetration while maintaining breathability and comfort. In one embodiment, the weave 110 contains about 8700 filaments per square inch. In one embodiment, the weave 110 of untwisted, continuous filament polyester warps 101,102,103,104 and wefts 105,106,107,108 results in a material 100 that can withstand 75 or more cleaning processings without degradation in its fluid-resistant characteristics. In one embodiment, the density of warps 101,102,103,104 and wefts 105,106,107,108 results in a 2.2-ounce polyester weave 110. In another embodiment, the density of warps 101,102,103, 104 and wefts 105,106,107,108 results in a 2.6-ounce polyester weave 110.

In contrast to the weave 110 shown in FIG. 1, most prior art gowns with sealed seams use knit fabrics that sandwich a membrane layer. As is known in the art, knit fabrics are produced on large knitting machines that "knit" different yarns together. Knit fabrics are generally manufactured from one continuous thread in contrast to the two threads shown in FIG. 1 that form the warps 101,102,103,104 and wefts 105,106,107,108, respectively. Disadvantageously, knit fabrics stretch and offer very poor fluid penetration resistance. This is one of the reasons that the membrane layer is required. By contrast, the taffeta weave of the material 100 of FIG. 1 can be used to construct lightweight, comfortable gowns or other garments featuring a single-ply, liquid and pathogen resistant layer. Moreover, the material 100 of FIG. 1 does not stretch as do knitted fabrics.

While untwisted, continuous filament polyester is one material that can be used for the warps 101,102,103,104 and wefts 105,106,107,108, others will be obvious to those of ordinary skill in the art having the benefit of this disclosure. For example, in one embodiment synthetic materials other than polyester may be utilized where the synthetic material is capable of being configured into a taffeta weave.

In one embodiment, the material 100 is characterized by a comparatively higher tensile strength than materials that use non-synthetic materials, such as cotton, wool, silk, or blends, such as cotton-polyester or other blended materials. The higher tensile strength is due to the use of untwisted, continuous filament polyester for both the warps 101,102, 103,104 and wefts 105,106,107,108. It should be noted that in one embodiment the material 100 is also lighter than fabrics using natural or blended materials as well. As noted above, the use of untwisted, continuous filament polyester also allows the material 100 to be subjected to numerous laundry cycles without destroying its fluid barrier properties, its brightness, or its color. As will be noted below, in one or more embodiments the material 100 can be color-coded to indicate size of gowns made from the material 100. Accordingly, resistance to color change can be an advantageous property. In one embodiment, the material 100 maintains its fluid barrier properties through at least 75 institutional laundry cycles and in some instances after at least 125 cycles.

The fact that the material 100 is washable in one embodiment is advantageous. For example, when used to create garments, the user of the garments may face the choice between disposable textiles and reusables. This choice can be daunting. However, the reusable nature of the material 100 can advantageously reduce waste. For example, when the material 100 is used to create surgical gowns, experimental testing has shown that use of the material 100 can result in a waste reduction from one operating room by an average of 65 percent. This reduction in waste results in lower disposal costs. In addition, while it may seem as though cleaning reusable textiles would expend large amounts of energy and water, modern equipment and engineering keep energy use low and use water efficiently. Finally, the material 100 is also low-linting and comfortable.

In one embodiment, the weave 110 also includes a carbon filament 109,111. The carbon filament 109,111 can be configured as a weft, as a warp, or both. In the illustrative embodiment of FIG. 1, carbon filament 109 is configured as a weft while carbon filament 111 is configured as a warp.

In one embodiment, the material 100 is about 99% untwisted, continuous filament polyester and about 1% carbon filament by weight. The term "about" is used herein to refer to a specification inclusive of manufacturing tolerances. For example, if the tolerance was 99% polyester by weight, with a manufacturing tolerance of plus or minus 2%, both 96.4% and 101.8% would be "about" 99%.

Figure 2:
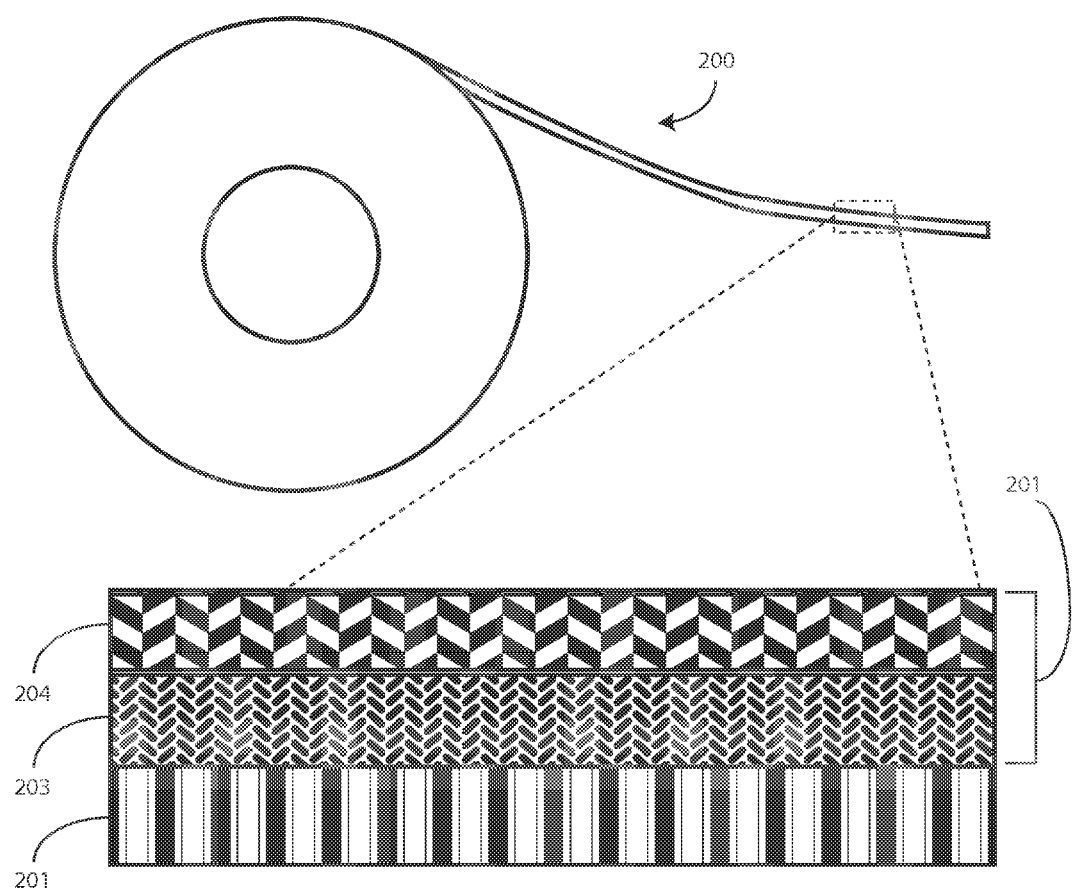
FIG. 2 illustrates one explanatory seam sealing material configured in accordance with one or more embodiments of the disclosure.

Turning now to FIG. 2, illustrated therein is one embodiment of a tape 200 suitable for sealing seams in accordance with one or more embodiments of the disclosure. In one embodiment, the tape 200 comprises a porous polytetrafluoroethylene tape. In one embodiment, the tape 200 comprises an expanded porous polytetrafluoroethylene tape. While a porous polytetrafluoroethylene tape is one example of a tape, it will be clear to those of ordinary skill having the benefit of this disclosure that other types of sealing tape may be employed as well. For example, tapes having applied adhesive thereon, or tapes in which an adhesive is applied to a backing material can alternatively be used.

In FIG. 2 the tape 200 includes an expanded porous polytetrafluoroethylene layer 201. In one embodiment, the expanded porous polytetrafluoroethylene layer 201 has pores that are filled with a cured or partially cured thermosetting adhesive 203 on one side. On the other side 204, the expanded porous polytetrafluoroethylene layer 201 is essentially full density as a result of compression of the pores on that side 204. Bonded to cured or partially cured thermosetting adhesive 203 is a layer of thermoplastic hot melt adhesive 202. One example of tape 200 is described in U.S. Pat. No. 5,162,149, which is incorporated herein by reference.

Figure 3:
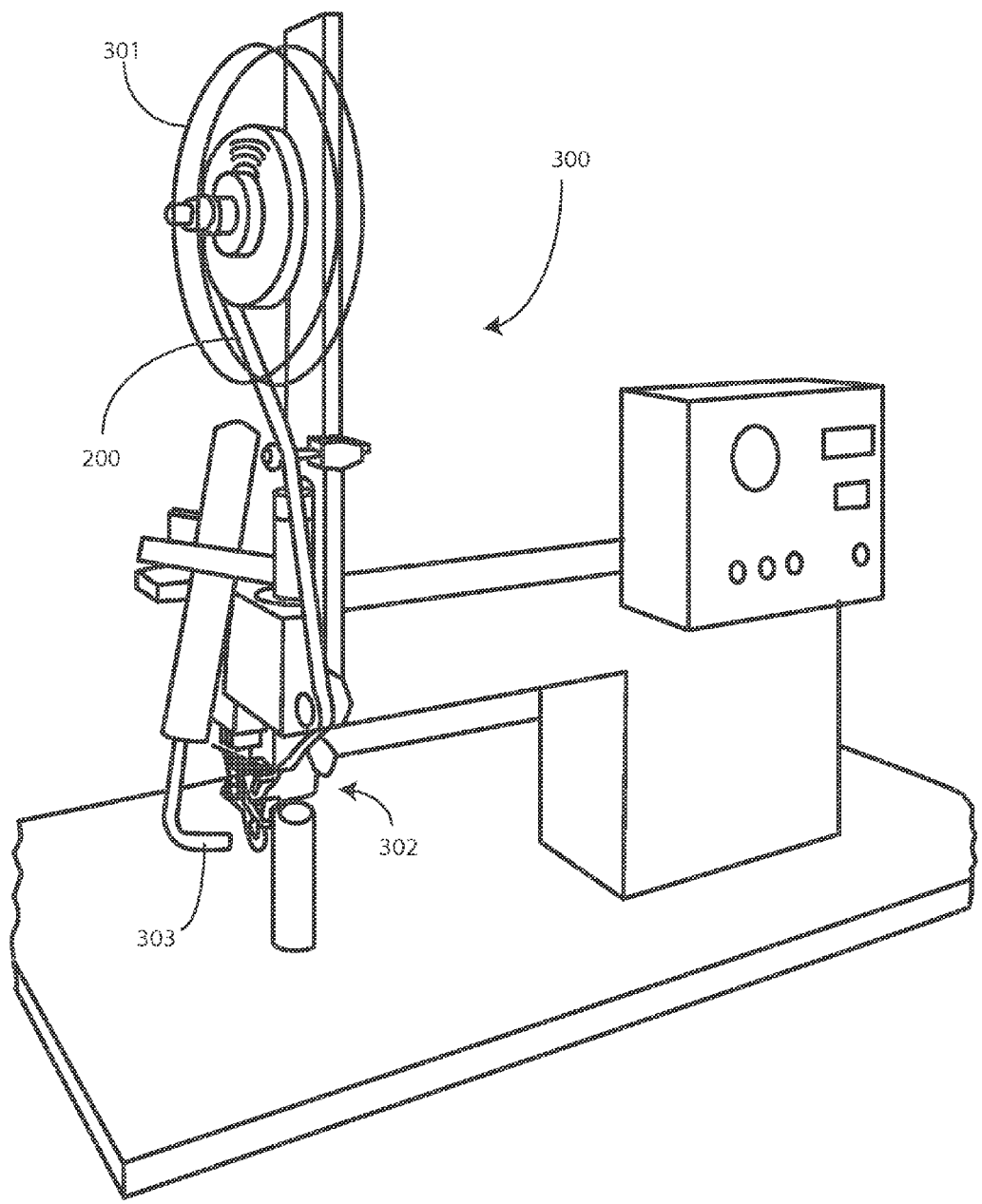
FIG. 3 illustrates one explanatory seam-sealing device configured in accordance with one or more embodiments of the disclosure.

Turning now to FIG. 3, illustrated therein is one explanatory seam sealing apparatus 300 suitable for sealing the tape 200 to a seam formed by sewing two layers of material (100) together. The apparatus 300 is described in further detail in U.S. Pat. No. 6,887,335, which is incorporated herein by reference. The apparatus 300 can be used to guide a seam having tape 200 disposed therein so as to thermally cause the tape 200 to the carbon filament (109,111) of the material (100).

As shown in FIG. 3, the apparatus 300 includes a roll 301 of the tape 200 mounted thereon. The tape 200 is fed into a sealer 302 that includes an upper roller, tape guides, and an actuator. The sealer 302 can be lowered according to predetermined settings to effect advancement of the tape 200 and material (100) being fed into the sealer 302. A drive mechanism can drive the rollers to feed the tape 200 and material (100) through the sealer 302.

A hot air gun 303 provides heat to the tape 200 to adhere it to the carbon filament (109,111) of the material (100) as it passes through the sealer 302. A heated air supply feeds the hot air gun 303, which directs the heated air into the consolidation nip and to the tape 200 on demand. In effect, the hot air gun 303 blows the hot air along the tape 200 as it passes through the sealer 302 while disposed upon a seam. It should be noted that other embodiments, the hot air gun 303 can be replaced with a hot roller, which passes over the tape 200 to seal it to the carbon filament (109,111) of the material (100). In yet another embodiment, the hot air gun 304 can be replaced with a hot press, which can be applied to the tape 200 to seal it to the carbon filament (109,111) of the material (100).

Figure 4:
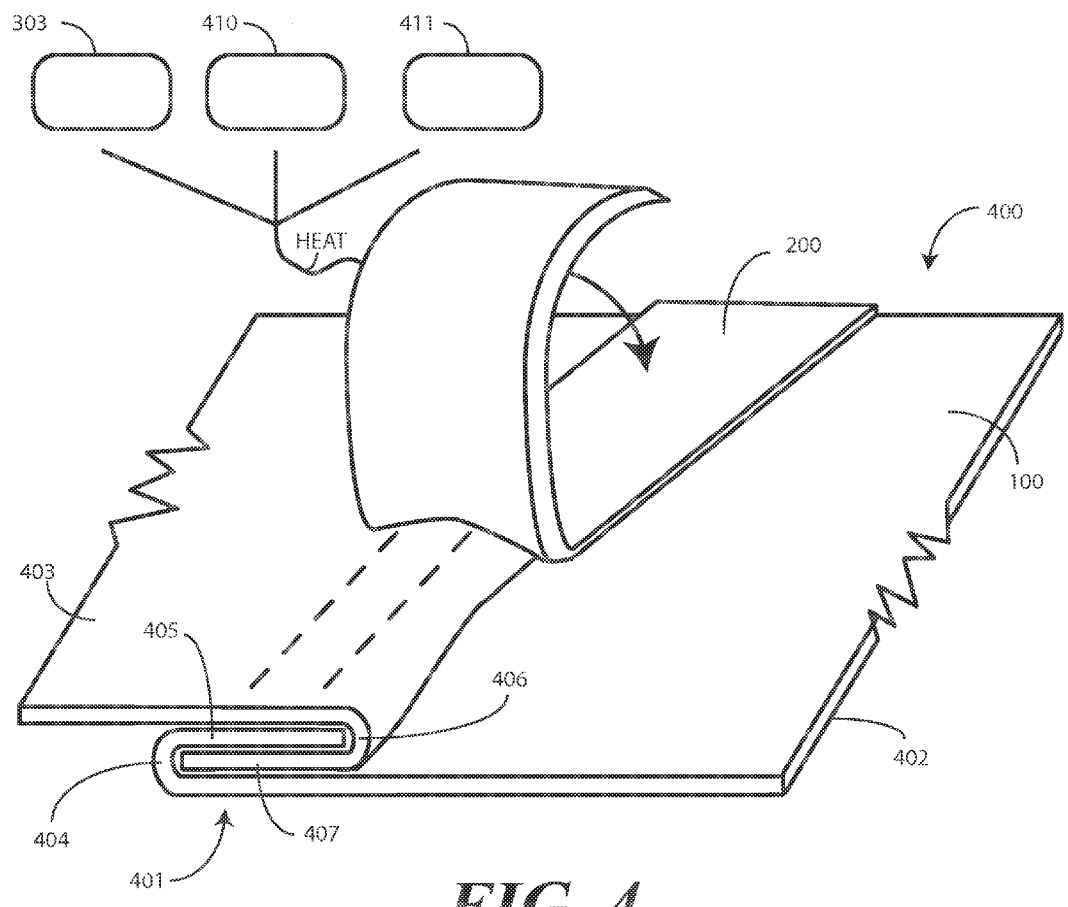
FIG. 4 illustrates one explanatory method of sealing a seam in accordance with one or more embodiments of the disclosure.

Turning now to FIG. 4, illustrated therein is a work piece 400 suitable for feeding into the sealer (302) of the apparatus (300) of FIG. 3. As shown in FIG. 4, a seam 401 is first constructed by sewing two layers 402,403 of material 100 together. In the illustrative embodiment of FIG. 4, the seam 401 comprises a double-C interlocking seam. A first C 404 is formed by folding a section 405 of the first layer 402 of material 100 back over itself. At the same time, a second C 406 is constructed by folding a section 407 of the second layer 403 of material 100 back over on itself. The two Cs 404,406 are then interlocked as shown in FIG. 4. Stitching 408,409 is then applied to the double-C interlocking seam. The tape 200 is then placed across the seam 401.

Once the seam is created, the tape 200 can be thermally affixed to the carbon filament (109,111) of the material 100 in a variety of ways. In one embodiment, a hot air gun 303 blows the hot air along the tape 200 to seal the tape 200 to the carbon filament (109,111). In another embodiment, a hot roller 410 passes over the tape 200 to seal it to the carbon filament (109,111) of the material 100. In yet another embodiment, a hot press 411 can be applied to the tape 200 to seal it to the carbon filament (109,111) of the material (100).

Figure 5:
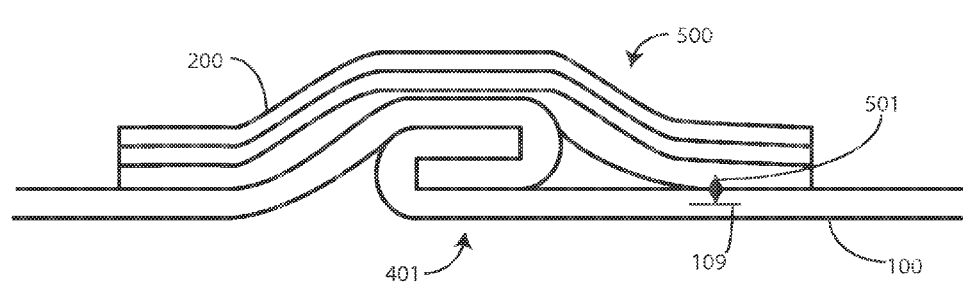
FIG. 5 illustrates a sectional view of one explanatory sealed seam configured in accordance with on or more embodiments of the disclosure.

Turning now to FIG. 5, illustrated therein is a sealed seam 500. As shown in FIG. 5, the tape 200 has become thermally affixed 501 to at least one carbon filament 109 of the one-ply weave of the material 100. The tape 200 covers the entirety of the seam 401, thereby creating a liquid and contaminant impenetrable barrier along the seam 401.

Figure 6:
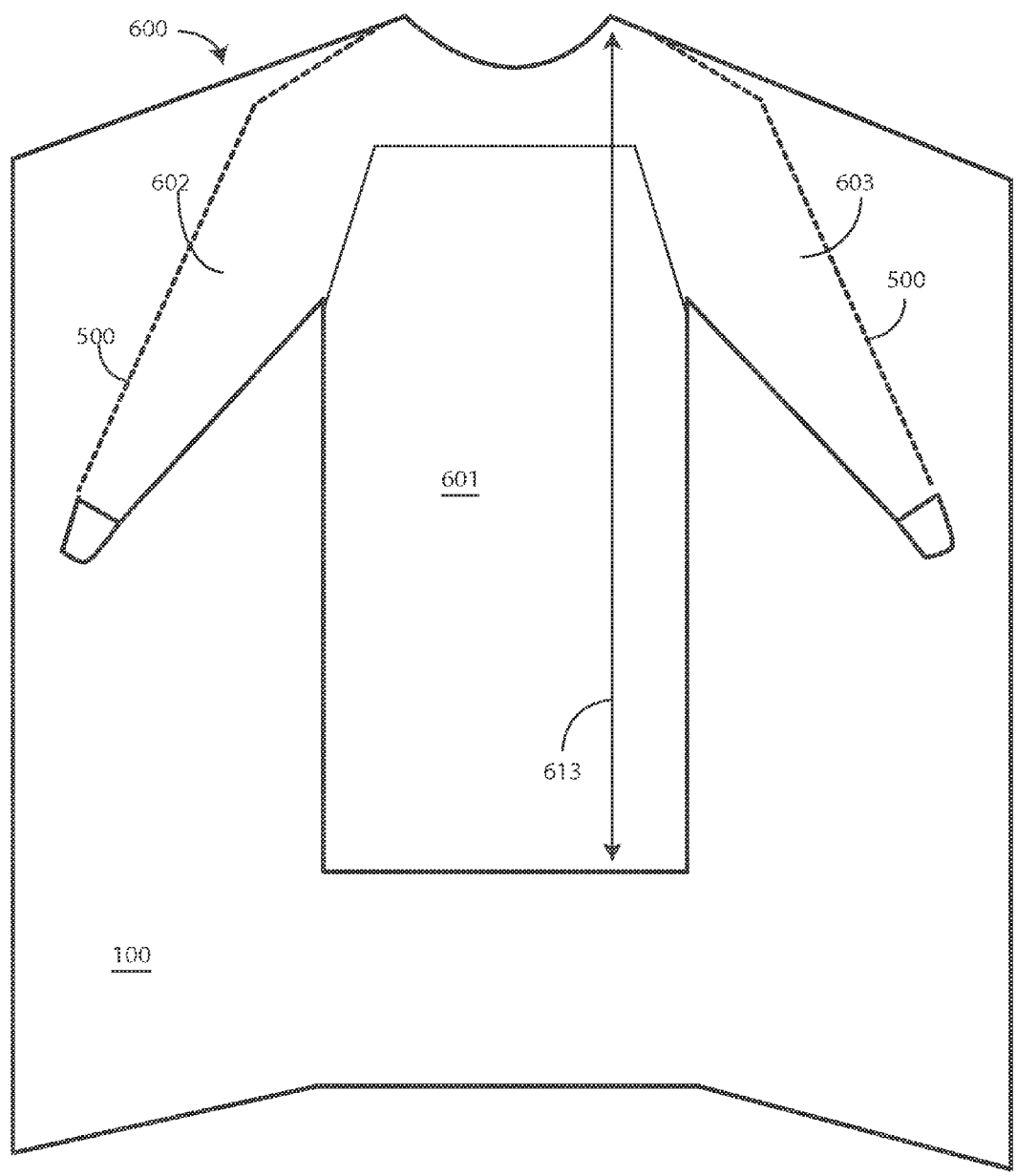
FIG. 6 illustrates one explanatory gown configured in accordance with one or more embodiments of the disclosure.

Turning now to FIG. 6, illustrated therein is illustrated therein is a protective garment 600, shown in pattern form, and configured in accordance with one or more embodiments of the disclosure. For ease of illustration, the illustrative protective garment 600 shown throughout the views is configured as a medical gown. However, it will be clear to those of ordinary skill in the art having the benefit of this disclosure that the protective garment 600 could be configured in accordance with the needs of other professions, applications, and requirements. A medical gown is merely one explanatory embodiment.

A body covering portion 601 is configured to wrap about the torso of a wearer. In one embodiment, the body covering portion 601 is manufactured from a woven fabric, such as the material 100 of FIG. 1. Where a woven material is used, body covering portion 601 can be configured for laundering and reuse. One or more antimicrobial layers can be added to further enhance antimicrobial protection. In one embodiment, the length 613 of the body covering portion 601 is configured to run from at least a wearer's shoulder to below their knee.

A first sleeve 602 and a second sleeve 603 extend distally from the body covering portion 601. The first sleeve 602 and the second sleeve 603 are configured to receive wearer's arms when the protective garment 600 is donned. As will be described below, one or both of the first sleeve 602 and the second sleeve 603 can comprise a sealed seam 500 like the one described above with reference to FIG. 5.

The protective garment 600 may optionally include pockets or other surface features. A front portion of the body covering portion 601 is configured to be placed against the front of the torso of a wearer. The body covering portion 601 then wraps around and terminates behind the wearer in one embodiment.

In one embodiment, the material 100 and its sealed seams 500 can be configured to meet the PB70 Standard of the Association for the Advancement of Medical Instrumentation (AAMI). For example, the material 100 and its sealed seams 500 may have a moisture vapor transmission rate (MVTR) that allows for comfort during wearing while still meeting the Spray impact test (AATCC42), Hydrostatic Pressure testing (AATCC127) and Viral Penetration testing (ASTM-F1671) guidelines. For medical applications the material 100 and sealed seams 500 each have properties that prevent contaminants from passing through to the care giver. For example the protective garment 600 can include a layer of the material 100 and a sealed seam 500 that is sealed by a layer of porous polytetrafluoroethylene tape (200) that is thermally attached to the weave (110) of the material 100 so as to have vapor and moisture barrier characteristics that may be required by an applicable AAMI level. This allows the protective garment 600 to perform as an infection protection measure.

Figure 7:
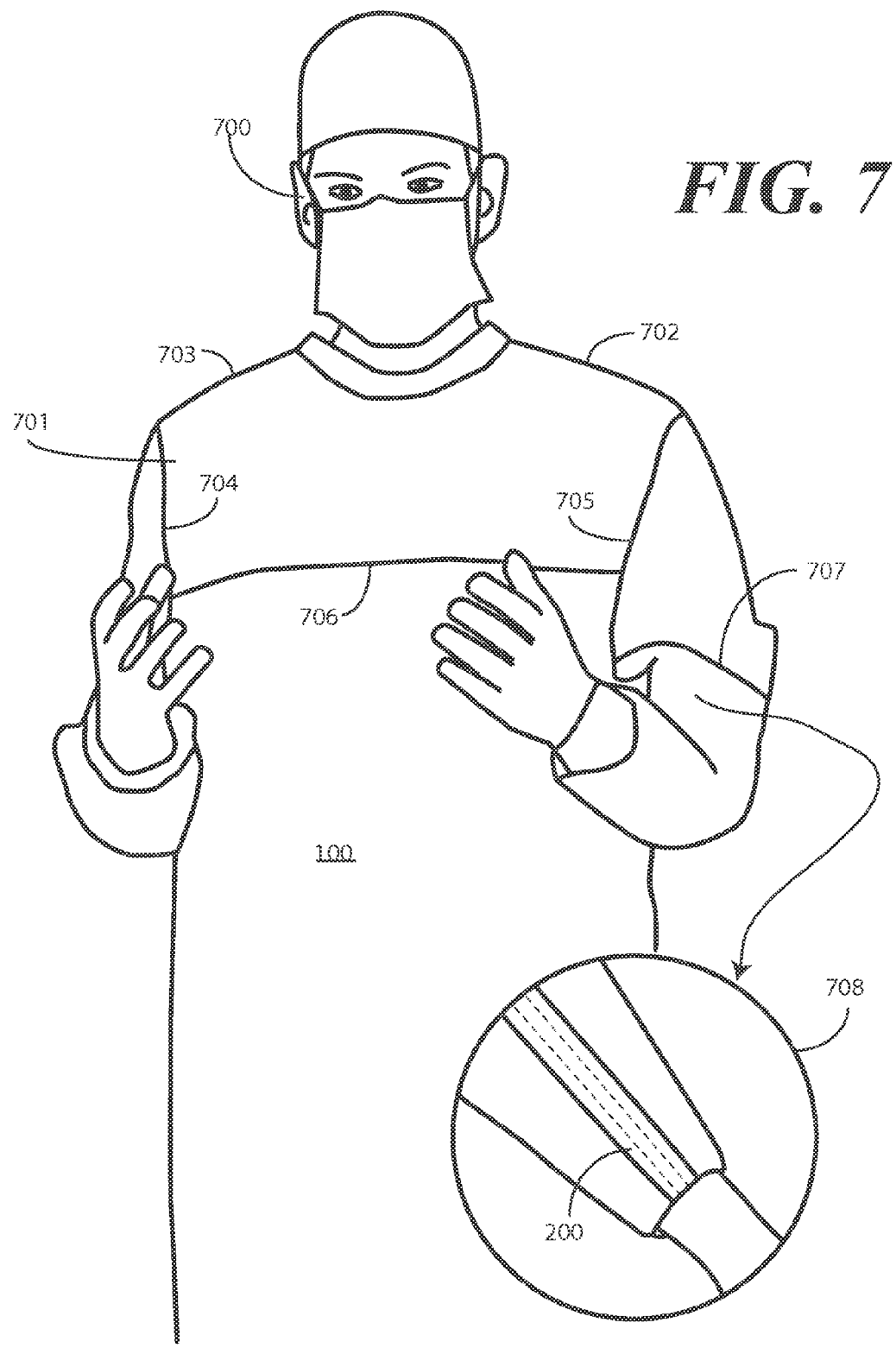
FIG. 7 illustrates another explanatory gown configured in accordance with one or more embodiments of the disclosure.

Turning now to FIG. 7, a health care services provider 700 is shown wearing one embodiment of a medical gown 701 configured in accordance with one or more embodiments of the disclosure. The illustrative medical gown 701 includes a layer of material 100 that includes a weave (110) of untwisted continuous filament polyester and carbon filament. One or more seams 702,703,704,705,706,707 are disposed along the medical gown 701. In one embodiment, each seam 702,703,704,705,706,707 comprises a double-C interlocking seam.

As shown in the exploded view 708 of seam 707, in one embodiment the seam 707 is sealed by a porous polytetrafluoroethylene tape 200 that is thermally attached to the weave (110) of the material 100. In one embodiment, the seam 707 is sealed to form a AAM1-PB70 Level-3 seal.

In one or more embodiments, the medical gown 701 is color-coded for size. For example, a ciel blue gown may be a large, while a white gown is extra large, a green gown is extra-extra large, and so forth. In another embodiment, the medical gown 701 has a common color across all sizes, with only the collar and/or cuffs being color coded to indicate size. Other color combinations will be obvious to those of ordinary skill in the art having the benefit of this disclosure.

Figure 8:
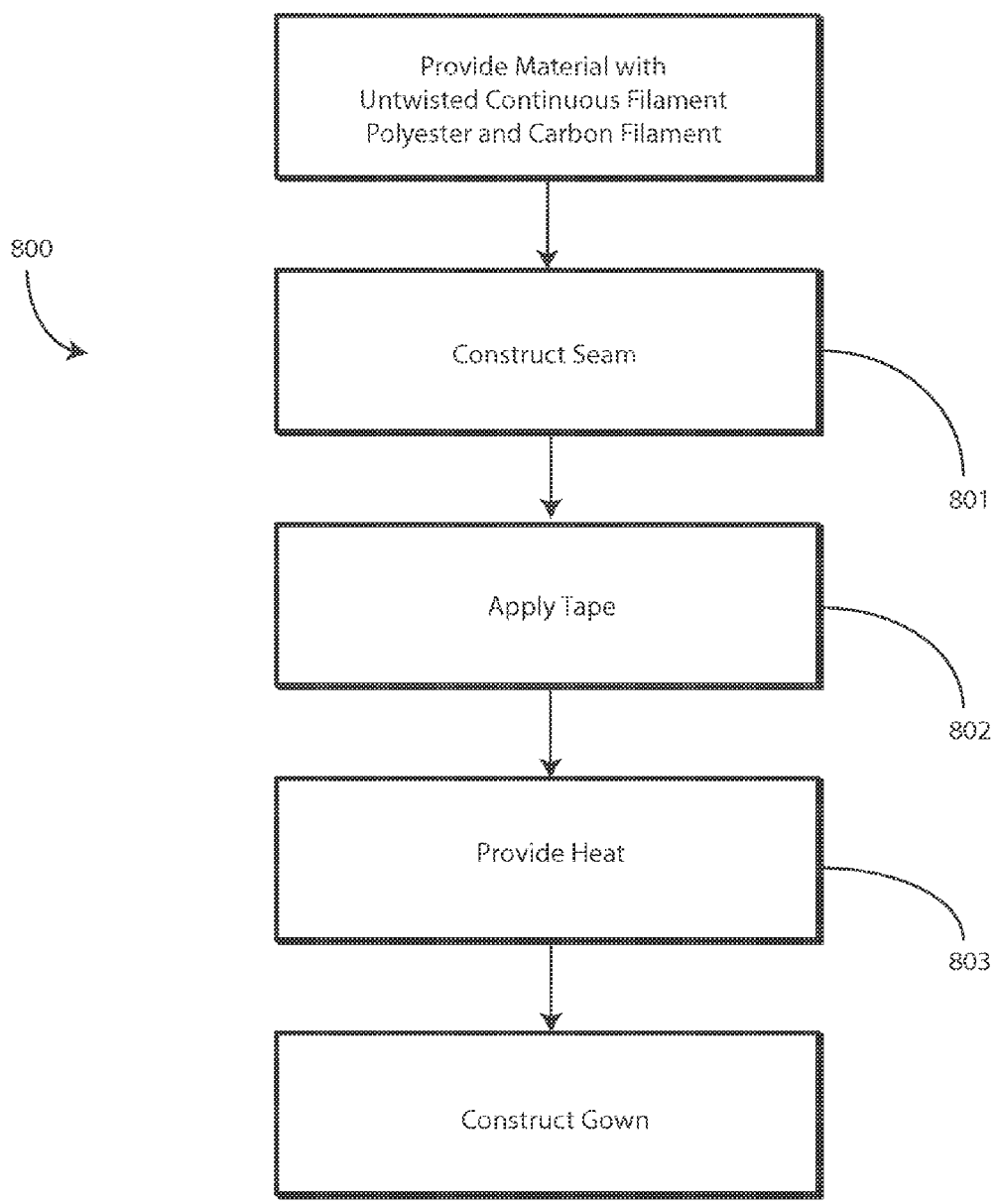
FIG. 8 illustrates one explanatory method of manufacturing a gown with sealed seams configured in accordance with one or more embodiments of the disclosure.

Turning now to FIG. 8, illustrated therein is one explanatory method 800 for sealing the seam of a medical gown configured in accordance with one or more embodiments of the disclosure. At step 801, a seam is constructed by sewing two layers of material together. In one embodiment, each layer of material comprises a weave of untwisted continuous filament polyester and carbon filament. In one embodiment, the seam comprises a double-C interlocking seam, although other seams will be obvious to those of ordinary skill in the art having the benefit of this disclosure.

At step 802, a layer of tape is applied along the seam. In one embodiment, the tape is a porous polytetrafluoroethylene tape. At step 803, heat is provided to the tape, thereby causing the tape to adhere to the weave. In one embodiment, the heat is provided to cause the tape to adhere to a carbon filament of the weave. The heat can be provided in one of a variety of ways at step 803. In one embodiment, the provision of heat comprises blowing hot air along the tape. In another embodiment, the provision of heat comprises passing a hot roller along the tape. In yet another embodiment, the provision of heat comprises applying a hot press to the tape.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method for sealing a seam of a medical gown, comprising:
    constructing the seam by sewing two layers of material together, each layer of material comprising a weave of untwisted continuous filament polyester and carbon filament;
    applying a porous polytetrafluoroethylene tape along the seam; and
    providing heat to the porous polytetrafluoroethylene tape, thereby causing the porous polytetrafluoroethylene tape to adhere to the weave;
    the weave comprising a taffeta weave.

2. The method of claim 1, the each layer of material comprising about ninety-nine percent of the untwisted continuous filament polyester and about one percent of the carbon filament by weight.

3. The method of claim 1, the each layer of material comprising a one-ply weave.

4. The method of claim 1, the providing the heat comprising blowing hot air along the porous polytetrafluoroethylene tape.

5. The method of claim 1, the providing the heat comprising passing a hot roller along the porous polytetrafluoroethylene tape.

6. The method of claim 1, the providing the heat comprising applying a hot press to the porous polytetrafluoroethylene tape.

7. The method of claim 1, the each layer of material comprising 2.2 ounce polyester.

8. The method of claim 1, the each layer of material comprising 2.6 ounce polyester.

9. The method of claim 1, the providing the heat resulting in an AAMI-PB70 Level-3 seal along the seam.

10. The method of claim 1, the constructing comprising creating a double-C, interlocking seam.

11. The method of claim 1, the each layer of material being color coded to indicate size.

* * * * *